Patented Nov. 18, 1947

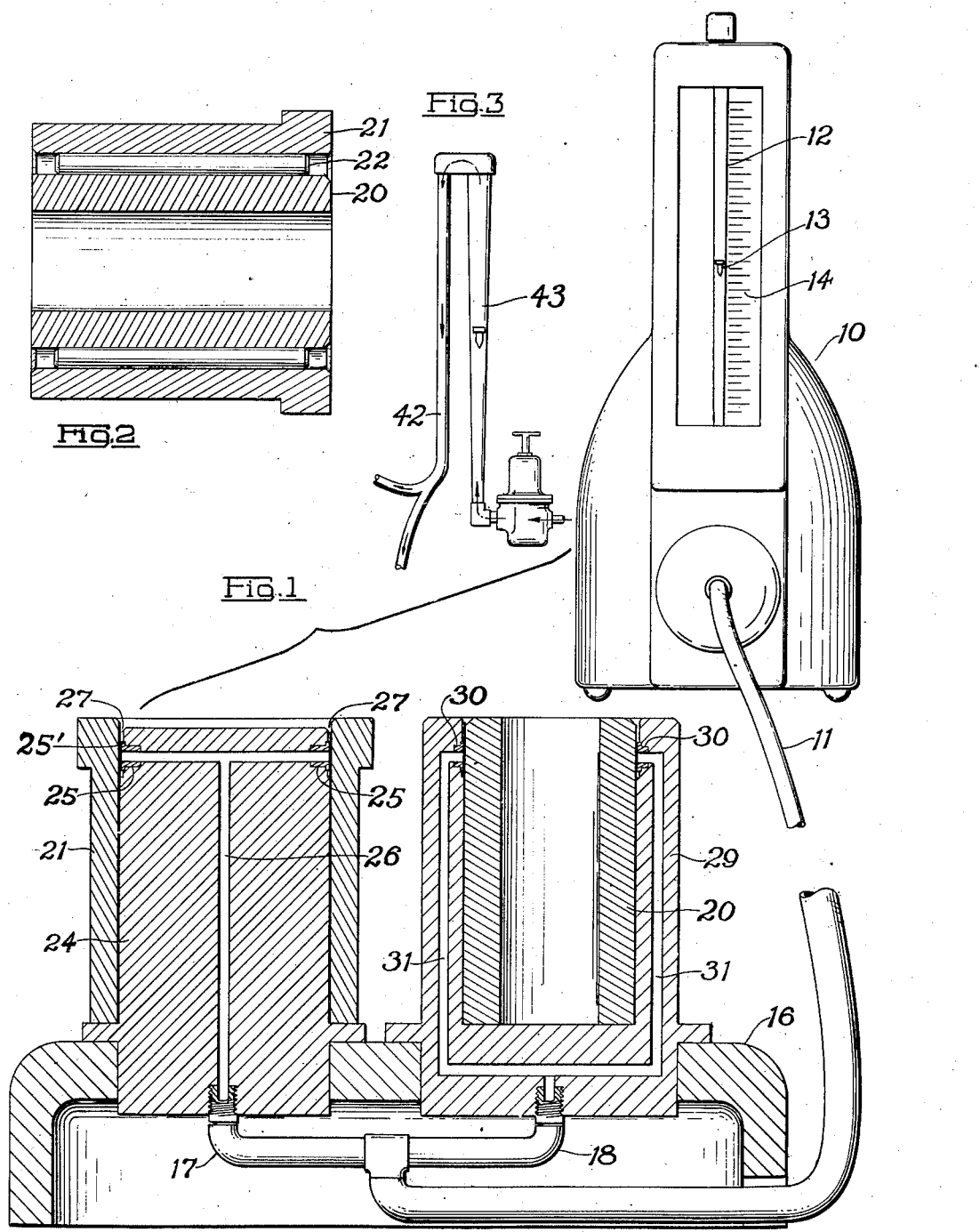

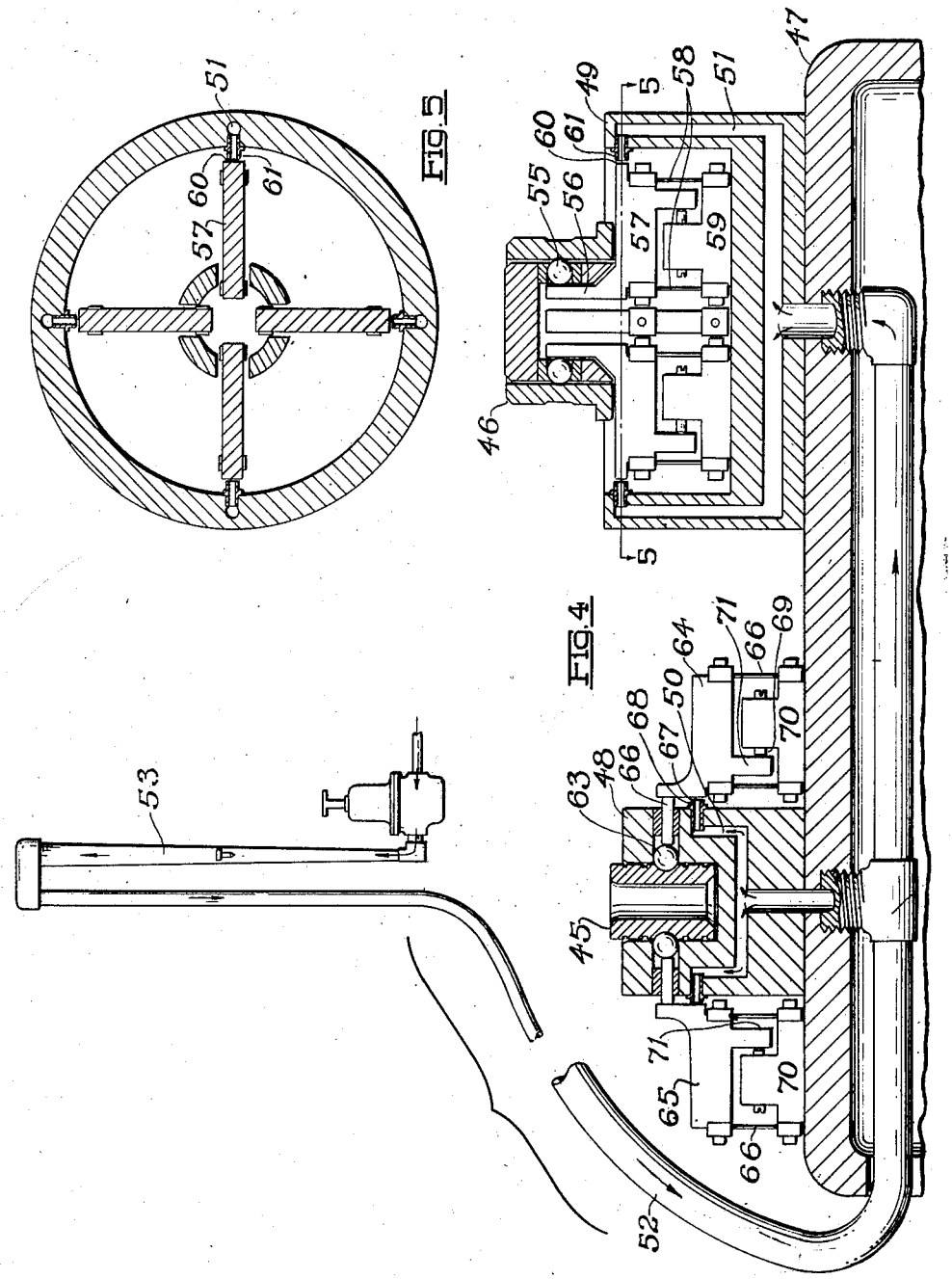

2,431,087

UNITED STATES PATENT OFFICE 2,431,087

PNEUMATIC GAUGING DEVICE

Leonard Saul Subber, Philadelphia, Pa., assignor to The Sheffield Corporation, Dayton, Ohio, a corporation of Ohio Application December 27, 1943, Serial No. 515,659

7 Claims. (Cl. 73—37.5.)

This invention relates to gauging apparatus for measuring or comparing workpiece surfaces.

One object of the invention is the provision of a gauging apparatus for determining the size relationship of a plurality of different workpiece surfaces, and arranged so that the reading or indication is obtained on a single means.

Another object is the provision of a gauging apparatus for simultaneously comparing an internal dimension and an external dimension of workpiece surfaces and measuring the size differential of such surfaces regardless of variations, in a working range, of the size of either of said surfaces.

Another object is the provision of a gauging apparatus of the character mentioned, and employing fluid flow through parallel paths controlled by the internal and external workpiece surfaces to be checked, and associated with a common indicating device.

Another object is the provision of a gauging apparatus of the character mentioned, in which the fluid flow controlling members are leakage orifices having diametrically opposed portions, and the gauging device is operated by the rate of flow of gaseous fluid.

Another object is the provision of a gauging apparatus for measuring the size differential of an internal diameter on a female part and an external diameter on a cooperating male part to determine the size of intermediary means that is properly usable between the male and female parts when assembled.

Other objects and advantages of the invention will be apparent from the following description, the appended claims and the accompanying drawing, in which, Fig. 1 is a front elevation of a gauging apparatus embodying the present invention, and showing the work engaging parts thereof in central vertical section;

Fig. 2 is a transverse section of inner and outer bearing members such as may be checked by the gauging apparatus shown in Fig. 1;

Fig. 3 is a diagrammatic view of the measuring instrument that may be used;

Fig. 4 is a central vertical section showing another form of the invention; and

Fig. 5 is a horizontal section on the line 5—5 of Fig. 4.

Referring more particularly to the drawing, in which the same reference numerals have been used to designate like parts in several views, the gauging device shown in Fig. 1 incorporates a gauging device 10 which, as herein shown, is adapted to provide an indication in accordance with the flow of fluid through a conduit 11 which leads from the instrument and which is associated, as will be presently described, with fluid flow controlling means that controls fluid flow in accordance with the size of the workpiece surfaces being checked.

While the measuring instrument may take a wide variety of different forms or operate in response to changes in fluid flow by pressure measurements, it is preferred that the instrument include an indicator responsive to the rate of flow of fluid from a suitable supply source of air pressure to and through the conduit 11. A gauging device of the character shown in Patent 2,254,259, granted September 2, 1941, may be used. Such an instrument comprises a transparent tube 12 having an upwardly flaring or tapered passage enclosing an indicator or float 13 the height of which, in the tube, is determined by the rate of flow of air or other fluid through the tube. The lower end of the tube is connected through an adjustable pressure regulating valve to an air supply source, and the upper end of the tube is in free communication with the end of the conduit 11. The vertical position of the float 13 may be accurately measured by means of graduations 14 which may be calibrated to show actual size differential in the diametrical or other measurements of the internal and external surfaces to be checked.

The conduit 11 extends to a base member 16, and has branch passages 17 and 18 one of which controls the flow of fluid through fluid flow controlling members associated with an internal surface of a part to be checked, while the other branch passage is associated with fluid flow controlling members controlled by another surface, which, in Figs. 1 and 2, is the external surface of another part to be checked. As shown in Figs. 1 and 2, the gauging device is adapted to show the size relationship of the outside diameter of an inner bearing member 20 and the internal diameter of an outer bearing member 21 and thus determine the size of the anti-friction balls or rollers that should be used in conjunction with these bearing members in forming a complete bearing assembly. As here shown, the anti-friction bearing members are rollers 22. Where inner and outer bearing members roll directly one on another, the external diameter of the male member and the internal diameter of the female member may be simultaneously gauged to determine the relative fit of such members. Thus in assembling and sorting inner and outer bearing members into cooperating pairs, inner and outer bearing members of the proper size to give a correct fit may be matched, and in sorting inner and outer races, the gauging device is used to select the proper size rollers for any pair of cooperating races that are simultaneously applied to the gauging apparatus.

The base 16 is provided with a work receiver or holder 24 on which the outer bearing race can be applied. The outer diameter of the holder 24 is slightly smaller than the minimum internal diameter of the range of sizes of outer races that will be applied to it. The holder 24 carries a pair of diametrically opposed gauging nozzles 25 the outer cylindrically curved surfaces 25' of which are arranged very slightly below the outer surface of the holder 24. The two gauging nozzles 25 are in free communication through a passage 26 with a branch passage 17 so the fluid supplied under pressure to branch passage 17 will leak through the gauging nozzles, between the outer surfaces of these nozzles and the inner surface of the outer race. The fluid supplied through the nozzles flows freely to the atmosphere through exhaust passages 27. Thus the distance between the workpiece and the outer surface of the nozzles will determine the rate of flow of fluid through the branch passage 17.

Adjacent the holder 24 is a second holder 29 into which the inner race 20 can be telescoped. The passage in the holder 29 is slightly larger in diameter than the maximum diameter of the inner race that will be applied to the holder, and the diametrically opposed pair of gauging nozzles 30 which are arranged in the holder 29 have their inner gauging surfaces very slightly outwardly of the cylinder defined by the inner surface of the holder 29. The gauging surfaces of the nozzles 30 are concave, with a cylindrical curvature concentric with that of the inner race, and these gauging surfaces of the nozzles 30, and the outer gauging surfaces of the nozzles 25 as well, are of annular form concentric with the central passage through the nozzles. The two nozzles 30 are connected in parallel by means of conduits 31 to the branch passage 18 so that the rate of flow of fluid through the passage 18 is determined by the fit or clearance between the inner surfaces of the nozzles 30 and the outer surface of the inner race 20.

In accordance with the present invention the operator may take an inner race and an outer race from a group to be sorted and apply them to the holders 29 and 24 respectively, preferably at the same time by using both hands. He then glances at the float or indicator 13 of the gauging device 10 and by observing the reading on the indicator lines 14 he knows exactly the proper diameter of roller to be used with those particular races. The proper roller diameter may be determined with great accuracy and is readily measurable to a ten thousandth of an inch, and without requiring computations or even without knowing the exact diameter of either the outer race or the inner race surface. Within the working range of sizes, it is immaterial if the outer race is a little oversize or a little undersize, hence the parallel paths of flow of air through the two pairs of gauging nozzles automatically in themselves measure only the difference between the inside diameter of the outer race and the outside diameter of the inner race irrespective of any variation in size of either race from an intended or exact size. The opposed relationship of the gauging nozzles 25 and the opposed relationship of the gauging nozzles 30 provide a balancing effect so that if the part is not exactly centered with respect to the holder, the same amount of air leakage takes place as if it were exactly centered, the increase in spacing between the work and one nozzle causing a corresponding decrease in the space between the other nozzle to give a balancing effect and the same flow rate.

This is in distinction from an arrangement in which a size measurement is made in only a single point in the annular extent of a surface, as in that case an average condition or measurement is not obtained. It should be understood, however, that the use of two opposed gauging nozzles for measuring any diametrical measurement of a conical, cylindrical, or other surface to be measured gives a preferred construction in that it permits individual examination of the surface gauged along different diameters. However, the gauging means or orifices used in conjunction with a surface to be gauged may be distributed annularly around the surface or in fact may be one continuous annular groove giving an average condition in measuring the surface gauged, where it is unnecessary that different diametrical measurements of the same surface be obtained.

Fig. 3 shows the operation of the measuring instrument that may be used, 43 representing the flaring tube that contains the float and receives air from a suitable air regulator. 42 indicates the pipe in free communication with tube 43 and leading to the branch passages that extend to the work holder. The gauging device is arranged to give an indication to the operator showing the fluid flow through the several gauging nozzles. It will be obvious that, in a working range of sizes of internal and external diameters, the reading showing the difference between the inside and outside diameters of the surface checked will be accurate, and not affected by the exact diameter of either the inside or the outside surfaces. If both the inside and outside diameters are, say, two ten thousandths of an inch larger than an intended size, there will be an increase in the rate of flow of fluid to one set of gauging nozzles, and a corresponding decrease of the rate of flow of fluid through the other set to produce the same reading.

In the form of constructions shown in Figs. 4 and 5 the parts are arranged to determine the size of balls that should be employed between an inner ball-bearing member 45 and an outer bearing member 46. The base 47 supports a holder 48 for the inner bearing member and another holder 49 for the outer bearing member. The holders 48 and 49 are provided with fluid passages 50 and 51 respectively which are connected to the common pipe 52 leading to the upper end of the gauging device which is shown diagrammatically at 53. The gauging device may be similar to the gauging device shown in Fig. 1, and is arranged to give an indication to the operator, showing the rate at which fluid flows through the several gauging nozzles provided in the two holders. The scale or graduations on the gauging device are preferably calibrated to show the size of the balls that should be employed between the two bearing members, small variations in the size of the ball grooves in the two bearing members from any intended exact size being immaterial since it is only the relative size of the ball grooves that will be gauged.

The holder 49 supports a plurality of gauging balls 55, here shown as four in number since four gauging nozzles are employed, arranged 90 degrees apart. The balls are retained against excessive outward movement and may move radially inwardly when the workpiece is applied or removed. Each ball operates an arm 56 provided on a spring supported block 57 carried by a pair of parallel spaced spring blades 58 which are fixed at their upper ends to block 57 and at their lower ends to a carrying block 59 which is secured on the base portion of the holder. The spring blades 58 thus carry the movable block 57 for radial movement and block 57 is operated or positioned by its respective ball 55. At one end of the block 57 is a flat gauging surface 60 which is preferably slightly larger in diameter than the leakage orifice provided by a short pipe or tube 61 which communicates with the fluid passage 51. Normally there is a very slight spacing between the closure of the surface 60 on block 57 and the end of the tube 61, with the block 57 positioned by the work having a groove of the proper size, and consequently some small leakage of fluid supplied from the gauging device 53 will take place along the surface 60. With a ball groove of slightly larger diameter, the ball 55 will position the block 57 to reduce the size of this leakage orifice, and of course a ball groove of smaller diameter will open the leakage orifice wider. Since each of the four balls is arranged to operate its respective spring supported block, and with each spring supported block controlling a leakage orifice, leakage orifices being arranged diametrically opposite one another, the total leakage taking place in the holder 49 will be in accordance with the size of the ball groove of the work applied to it.

The holder 48 is provided with a plurality of gauging balls 63 which control spring supported blocks 64 and 65, radially operable pins 66 being interposed between the balls and the blocks. The blocks 64, which are supported by spring blades 66 are provided with flat leakage controlling surfaces 67 cooperating with the ends of leakage tubes 68 and normally having a slight spacing from the ends of these tubes when the blocks are positioned by a workpiece having a ball groove of the proper diameter. The opposed pair of leakage paths controlled by the opposed blocks are connected symmetrically to the common branch passage which extends to the conduit 52. When the work is applied to or removed from the holder 48, the balls 63 are moved out radially, forcing the spring supported blocks away from the ends of the leakage tubes temporarily, but the balls are promptly returned to a inner limiting position by the action of the spring blades 66 and by a spring pressed plunger 69 carried in each supporting block 70 and engaging a downwardly extending arm 71 of its respective spring supported block 64.

As will be apparent, if both the inside and outside diameters of the ball grooves in the two workpieces 45 and 46 are slightly larger than an intended size, there will be an increase in the rate of flow of fluid to the gauging nozzles associated with the pasage 50, and a corresponding decrease in the rate of flow of fluid through the gauging nozzles associated with the fluid passage 51, to produce the same reading calibrated in ball diameter, on the gauging device. The exact ball diameter that should be employed with any two ball race members is thus readily determined.

There is no intention to limit the invention to the particular embodiments herein shown, but on the other hand it is intended to cover all modifications and alternative constructions falling within the spirit and scope of the invention as expressed in the appended claims.

What is claimed is:

1. Gauging apparatus for simultaneously comparing an internal dimension of one work surface and an external dimension of a surface of another workpiece to determine their size relationship, comprising a fluid operated gauging device having means responsive to changes in fluid flow, a pair of fluid flow controlling members which respectively coact with and are controlled by the internal and external work surfaces to be compared, and a pair of branch fluid supply means, one for each of said controlling members, and both extending to said gauging device and connected thereto so that fluid from the gauging device is supplied through both of the branch fluid supply means, the size relationship of the internal and external work surfaces thus controlling the gauging device regardless of variations in size of the work surfaces in a working range.

2. Gauging apparatus for simultaneously comparing internal and external surfaces of different parts and of different diameters to determine their size relationship, comprising a fluid operated gauging device having indicating means responsive to changes of fluid flow, fluid supply means extending to said gauging device and having branch passages connected to the gauging device so that fluid from the gauging device is supplied through both said branch passages, a pair of diametrically opposed gauging portions adapted for cooperation with opposite sides of said internal surface and jointly providing for and controlling a leakage flow of fluid through one of said branch passages in accordance with the size of said surface, a second pair of diametrically opposed gauging portions adapted for cooperation with opposite sides of said external surface and jointly providing for and controlling a leakage flow of fluid through the other of said branch passages in accordance with the size of said surface, said gauging device showing the difference in diameters of the surfaces compared regardless of variations in diameter of either of said surfaces in a working range.

3. Gauging apparatus for simultaneously comparing the dimensions of different workpiece surfaces which are adapted to be assembled in predetermined interfitting relation, to determine their size relationship, comprising a fluid operated gauging device having indicating means responsive to changes of fluid flow, a fluid conduit extending to said gauging device and having branch passages, a gauging means adapted for cooperation with one of said surfaces and providing for and controlling a leakage flow of fluid through one of said branch passages in accordance with a size characteristic of said surface, additional gauging means adapted for cooperation with the other of said surfaces and providing for and controlling a leakage flow of fluid through the other of said branch passages, said gauging device showing the difference in size of the surfaces checked regardless of variations in size of said surfaces in a working range.

4. Gauging apparatus for simultaneously comparing an internal diameter and an external diameter of surfaces which are adapted to be assembled in predetermined interfitting relation, to determine their diametrical difference, comprising a fluid operated gauging device having indicating means responsive to changes in the rate of fluid flow, fluid flow controlling nozzles arranged in pairs, one pair for the internal diameter and one pair for the external diameter, a pair of branch conduits both communicating with said gauging device and each connected in parallel to a pair of fluid flow controlling nozzles one pair being controlled by the internal and the other pair by the external work surface to be compared to provide fluid leakage paths, whereby diametrical differences are indicated on the gauging device regardless of variations in diameters in a working range.

5. Gauging apparatus for simultaneously comparing an internal diameter and an external diameter of male and female parts of different diameters adapted to be assembled in predetermined interfitting relation, to determine their diametrical difference, comprising an air flow gauging device having indicating means, holding means for the male part, holding means for the female part, gauging means adapted for cooperation with the surface of the male part, gauging means adapted for cooperation with the female part, said gauging means being carried by their respective holding means and comprising fluid leakage orifices, and means for operatively interconnecting both of said gauging means to said gauging device whereby said gauging device indicates the difference in diameters of the male and female parts.

6. Gauging apparatus for simultaneously comparing an internal surface of one part and an external surface of a mating part adapted to be assembled with said one part in predetermined relation, to indicate the diametrical difference in said surfaces comprising a fluid operated gauging device having means responsive to changes in fluid flow, fluid supply means extending to said gauging device and having a pair of branch passages, two opposed fluid flow controlling members connected in parallel to one of said branch passages, said controlling members providing fluid leakage paths which increase in accordance with increase in size of the internal surface, two fluid flow controlling members connected in parallel to the other said branch passages and providing fluid leakage paths which decrease in accordance with increase in size of said external surface, said flow controlling members jointly determining the flow of fluid through said gauging device to provide an indication of the diametrical difference of said parts.

7. Gauging apparatus for simultaneously comparing an internal surface of one part and an external surface of a mating part adapted to be assembled to said one part in predetermined interfitting relation, to indicate the diametrical difference in said surfaces comprising a fluid operated gauging device having means responsive to changes in fluid flow, fluid supply means extending from said gauging device and having a pair of branch passages, two opposed fluid flow controlling members connected in parallel to one of said branch passages, two fluid flow controlling members connected in parallel to the other said branch passages, said controlling members providing fluid leakage paths which change in size in accordance with change in size of said surfaces, said flow controlling members jointly determining the flow of fluid through said gauging device to provide an indication of the diametrical differences of said parts, a base, and a pair of adjacent work receivers on said base respectively telescoping into and around the parts to be compared and supporting said flow controlling members in predetermined position.

LEONARD SAUL SUBBER.

REFERENCES CITED

The following references are of record in the file of this patent:

UNITED STATES PATENTS

| Number | Name | Date |
| --- | --- | --- |
| 201,798 | Larsen | Mar. 26, 1878 |
| 724,963 | Spaulding | Apr. 7, 1903 |
| 1,049,860 | Hirth | Jan. 7, 1913 |
| 1,446,149 | Benoit et al. | Feb. 20, 1923 |
| 1,921,997 | Bliss | Aug. 8, 1933 |
| 1,971,271 | Mennesson | Aug. 21, 1934 |
| 2,011,931 | Dreyer | Aug. 20, 1935 |
| 2,124,014 | Street | July 19, 1938 |
| 2,139,282 | Poock et al. | Dec. 6, 1938 |